United States Patent [19]

Takada et al.

[11] Patent Number: 5,023,436

[45] Date of Patent: Jun. 11, 1991

[54] CREDIT CARD HANDLING APPARATUS AND METHOD

[75] Inventors: Kazuo Takada; Osamu Shimoyama, both of Oiso, Japan

[73] Assignee: NCR Corporation, Dayton, Ohio

[21] Appl. No.: 539,949

[22] Filed: Jun. 18, 1990

[30] Foreign Application Priority Data

Jul. 6, 1989 [JP] Japan .................................. 1-173159

[51] Int. Cl.⁵ ........................ G06K 9/08; G11B 25/04
[52] U.S. Cl. .................................... 235/380; 235/379; 235/449; 360/2
[58] Field of Search ............... 235/379, 380, 449, 493, 235/381, 382, 436, 439; 360/2

[56] References Cited

U.S. PATENT DOCUMENTS

| | | |
|---|---|---|
| 4,562,340 | 12/1985 | Tateisi et al. . |
| 4,634,848 | 1/1987 | Shinohara et al. .................. 235/449 |
| 4,650,978 | 3/1987 | Hudson et al. .................. 235/381 X |
| 4,659,914 | 4/1987 | Kondo et al. ........................ 235/380 |
| 4,700,055 | 10/1987 | Kashkashian, Jr. . |
| 4,752,676 | 6/1988 | Leonard et al. ................ 235/449 X |
| 4,780,602 | 10/1988 | Kawana et al. . |
| 4,782,217 | 11/1988 | Soza et al. . |
| 4,866,545 | 9/1989 | LaManna et al. . |
| 4,937,436 | 6/1990 | Eglise et al. ..................... 235/449 X |

Primary Examiner—Stuart S. Levy
Assistant Examiner—Steven M. du Bois
Attorney, Agent, or Firm—Wilbert Hawk, Jr.; Albert L. Sessler, Jr.; Matthew R. Jenkins

[57] ABSTRACT

A method for searching the magnetic stripe on a credit card to determine the indispensably read out track comprising the steps of reading a card number from any one of the several tracks, determining if the credit card has an indispensably read out track already decided by the issuer of the card, reading out a track number for indispensable data from memory if such read out track has been decided, reading out indispensable data from the read out track using the track number, reading out a track searching mode on a priority basis from memory if such read out track has not been decided, reading out a first priority track which is known by the mode for the credit card, determining the read out data as being indispensable if no reading error occurs, and sending the indispensable data to a host computer for business transactions. The method is accomplished by apparatus for reading data from the tracks, for identifying the indispensably read track, and for performing the business transactions.

8 Claims, 5 Drawing Sheets

FIG. 4

| CARD ISSUER | CARD NUMBER | INDISPENSABLY READ TRACK | | | INDISPENSABLY READ TRACK RETRIEVING PROCEDURE | | |
|---|---|---|---|---|---|---|---|
| | | TRACK 1 | TRACK 2 | TRACK 3 | MODE 1 | MODE 2 | MODE 3 |
| A | 50000~59999 | 1 | | | | | |
| B | 60000~69999 | | | | | 1 | |
| C | 70000~79999 | | | 1 | | | |

FIG. 5

| MODE NUMBER | TRACK PROCESSING ORDER |
|---|---|
| 1 | TRACK 1 → TRACK 2 → TRACK 3 |
| 2 | TRACK 2 → TRACK 1 → TRACK 3 |
| 3 | TRACK 3 → TRACK 2 → TRACK 1 |

CREDIT CARD HANDLING APPARATUS AND METHOD

BACKGROUND OF THE INVENTION

In the field of credit card handling apparatus, a credit card issuer may have a single card that is adaptable for a plurality of financial transactions. A credit card issuer may also have a plurality of cards that are adaptable for different types of business transactions. The credit card may be used to extend credit to the customer or it may be used to draw money from a bank account on line so as to settle accounts which involve the purchase of goods or like transactions.

In an article purchase transaction by means of a point of sale (POS) system, an account is settled with the use of a credit card on which information regarding a customer is magnetically recorded. A magnetic stripe has previously been applied on the card by the issuer of the credit card. In the case of a credit card conforming to the ISO standard, the magnetic stripe consists of a maximum of three tracks and the card number is recorded in the second track (hereinafter referred to as track 2). Conventionally, it has been practiced that even if a different kind of card is used, the account can be settled with the use of a credit card based on the card number which is read out from track 2.

However, recently in certain European countries there is a tendency to use a credit card of the type in which important data such as the account number and the like are recorded in a track other than track 2, and charges involved are drawn on line from the bank account upon the settlement of the transaction. A credit card, as mentioned above, is designed so that unless the important data such as the account number or the like is read out, the account cannot be settled. Hereinafter, the track in which the important data is recorded is referred to as a track to be indispensably read (or an indispensably read track). In this regard, the information or data in track 2 is absolutely necessary or required for completing the transaction. However, credit card issuers can optionally select a track in which the important data is to be recorded, depending on the kind of the card. Under such circumstances, it is seen that an indispensably read track cannot be fixed and there is the possibility that some kinds of cards (variations of the VISA cards) issued from the same card issuer frequently cannot be processed by the same card handling apparatus. Under these circumstances, as mentioned above, such a problem arises that it sometimes occurs that in spite of those VISA cards which look the same as each other at a glance, one card can be handled by a card handling apparatus and another card cannot be handled by such apparatus. This situation arouses distrusts of credit card holders and causes confusion among the holders.

In addition, a system may be arranged in which all the data or information are read out from all of the tracks and sent out to a host computer regardless of the presence or absence of an indispensably read track. When the data are processed by the host computer a problem may exist that the data are too much to be handled by the host computer at one time, so that the data must be divided and sent out several times.

Representative documentation in the field of credit card handling apparatus includes U.S. Pat. No. 4,562,340, issued to K. Tateisi et al. on Dec. 31, 1985, which discloses a terminal device for making payments for credit transactions and comprising a card reader for reading data from either a credit card or a bank card.

U.S. Pat. No. 4,700,055, issued to A. Kashkashian on Oct. 13, 1987, discloses a multiple credit card microprocessor-based system which accepts the credit card, determines whether the credit card account selected for use by the card owner is valid, and prints a credit card invoice.

U.S. Pat. No. 4,780,602, issued to S. Kawana et al. on Oct. 25, 1988, discloses an IC card including means for determining whether data is correctly written in the memory area of the designated address.

U.S. Pat. No. 4,782,217, issued to H. R. Soza et al. on Nov. 1, 1988, discloses a financial transaction terminal and card reader system for reading data contained in magnetic stripes on a credit or a debit card.

U.S. Pat. No. 4,866,545, issued to R. J. LaManna et al. on Sept. 12, 1989, discloses a credit card embossing and recording system that verifies the accuracy of recording encoded data on one or more tracks of a recording medium by comparison of the recorded data with source data.

SUMMARY OF THE INVENTION

The present invention relates to credit card handling apparatus and method. More particularly, the present invention relates to an arrangement or a system wherein a credit card issuer may issue different kinds of cards or may optionally select the track on the card which contains indispensable data or information. Indispensable data is defined as that data which is absolutely necessary or required to complete a business transaction utilizing the particular credit card.

The system provides a customer information input section which is capable of reading the card data in all the tracks on the credit card and the system includes means for confirming an indispensably read track. The system also includes indispensably read track retrieving and defining means and a table for defining and detecting the indispensably read track in an overall arrangement which permits the handling of different kinds of credit cards issued from the same credit card issuer.

In accordance with the present invention, there is provided a card handling apparatus for reading magnetically recorded data on a card having a magnetic stripe with a plurality of recording tracks, for identifying a track to be indispensably read based on the data read out, and for performing a business transaction based on the data recorded in the indispensably read track, the apparatus comprising means for reading out data recorded in all the tracks on said card, memory means for storing all the data read out from each track, table means containing the number of tracks for the card and including retrieving procedure in predetermined format, means for confirming the indispensably read track for determining the issuer of the card in accordance with the read out data and to read out the number of the track to be read from the table means and to output a signal indicative of the track number, means for retrieving and determining the read out track in accordance with the predetermined retrieving procedure when a read out track cannot be confirmed by the confirming means and to output a signal indicative of the indispensably read track, and executing means for accessing data from the memory means in accordance with the indication from the confirming means or from the retrieving means.

In view of the above discussion, a principal object of the present invention is to provide card handling apparatus and method adapted to conform to the ISO standard in settling business transactions.

Another object of the present invention is to provide card handling apparatus wherein different kinds of credit cards issued by the same card issuer can be readily utilized in business transactions.

An additional object of the present invention is to provide a credit card system wherein each card includes a plurality of magnetic tracks and the system provides for selecting the correct track for retrieving data.

A further object of the present invention is to provide card handling apparatus wherein the card insurer can optionally select one track from a plurality of tracks of recorded data dependent upon the kind of card issued by the issuer.

Still another object of the present invention is to provide a card handling apparatus wherein all the cards issued from one card issuer and which are different in arrangement and design can be handled by the apparatus.

Additional advantages and features of the present invention will become apparent and fully understood from a reading of the following description taken together with the annexed drawing.

BRIEF DESCRIPTION OF THE DRAWING

FIG. 4 is an example of the table showing the data tracks and the several modes of retrieval procedure; and FIG. 5 shows an example of the order of priority of tracks to be processed in each mode of the indispensably read track retrieving procedure.

DESCRIPTION OF THE PREFERRED EMBODIMENT

Figure 1:
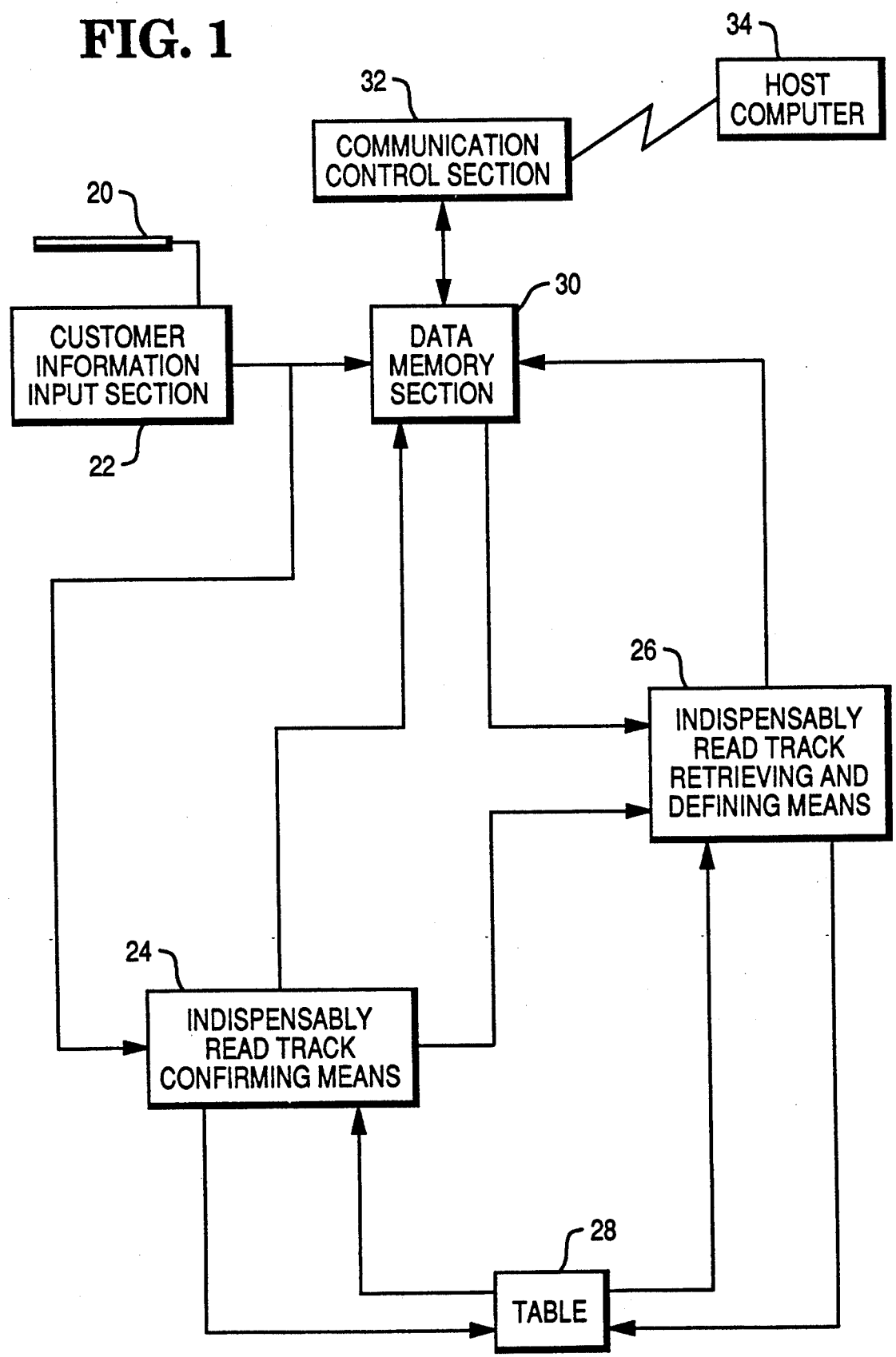
FIG. 1 is a block diagram illustrating the principle and incorporating subject matter of the present invention.

Referring to FIG. 1 of the drawing, when a credit card 20 is inserted by a customer into a customer information input section 22, card data such as the card number and identifying data or information which have been magnetically recorded on the card 20 are read out. An indispensably read track confirming means 24 confirms a particular or specific track to be indispensably read from the card number and which is read out in the input section 22. An indispensably read track retrieving and definitely determining (or defining) means 26 retrieves the indispensably read track when it is unknown and defines a track of a high probability to be identified as the indispensably read track. A table 28 is provided and is adapted to store data required for confirming and retrieving the indispensably read track. A data memory section 30 is adapted to store the data on cards and to send out only the data stored in the track specified by either the confirming means 24 or the defining means 26. A communications control section 32 is provided to control the data communication between the memory section 30 and a host computer 34.

In the above arrangement, the indispensably read track confirming means 24 confirms the indispensably read track in accordance with the card number which is read out in the input section 22 and in accordance with the data in the table 28. In case the indispensably read track is not identified from the card number thus read out in the input section 22, the indispensably read track retrieving and defining means 26 judges whether or not the data in each track is correct. This judgment decision is made in accordance with the indispensably read track retrieving means mode stored in the table 28 and defines a track of a high probability to be identified as the indispensably read track.

In accordance with the above description, only the data in the track determined by either the confirming means 24 or the defining means 26 is sent out to the host computer 34. In this manner the data to be transmitted to the host computer 34 can be minimized and all the cards issued from the same card issuer can be processed.

Figure 2:
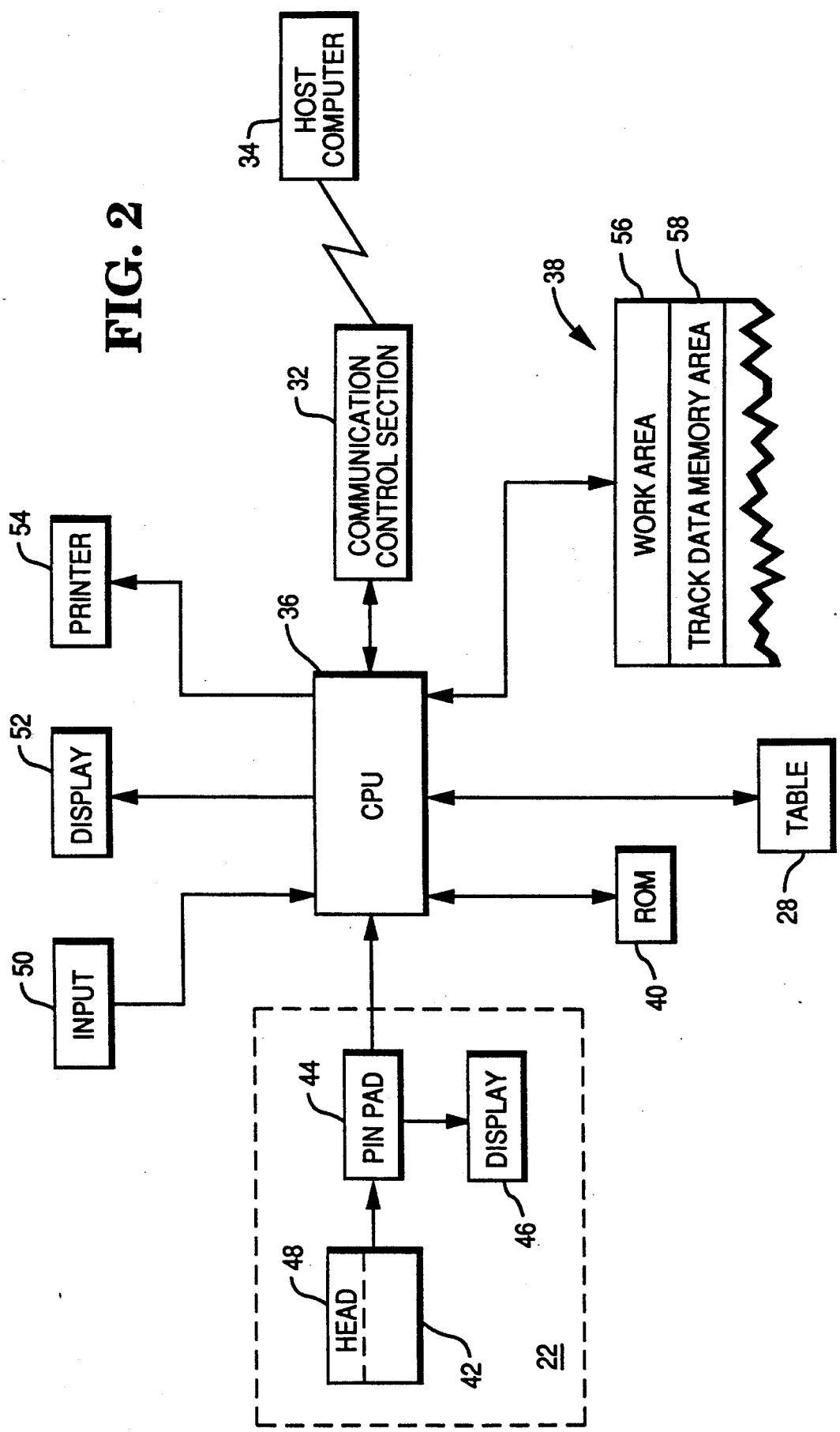
FIG. 2 is a schematic diagram showing the structure of the present invention which can be utilized with or applied to a point of sale terminal.

A preferred embodiment of the present invention which is applicable to a POS terminal (not shown) will be described with reference to the several figures of the accompanying drawing. FIG. 2 is a diagram showing the schematic structure according to the present invention and applied to a POS terminal. The interrelation and correlation between the elements shown in FIGS. 1 and 2 is now described. The data memory section 30 (FIG. 1) corresponds to and includes a central processing unit (CPU) 36 and a random access memory 38 (FIG. 2). The indispensably read track confirming means 24 and the indispensably read track retrieving and defining means 26 correspond to and include the CPU 36 and a read only memory (ROM) 40.

In FIG. 2, the customer information input section 22 consists of a card reader section 42, a (Personal Identification Number) PIN pad section 44 consisting of a keyboard through which a password number or the like are input, and a display section 46 adapted to display contents input through the keyboard and also to display certain procedures of the operations. The card reader section 42 includes a magnetic head section 48 which is capable of reading all of tracks 1, 2 and 3 into which data are written and conforming to the ISO standard on a magnetic stripe on the card 20. An input section 50 such as a scanner or a keyboard or the like is connected to the CPU 36 of the POS terminal. The ROM 40 provides memory into which programs required for the article transactions, track handling programs, control programs and fixed data are stored. The RAM 38 provides memory into which data required for the article transactions and data on each track on the cards are stored. A display section 52 and a printer 54 are coupled to the CPU 36.

In the above-mentioned and described arrangement, it is assumed that an article which has been purchased is already registered in the system. When an article code is input through the scanner on the input section 50, the CPU 36 accesses a (PLU) Price Look Up file (not shown) to read out therefrom the article name, class, unit price and the like corresponding to the article code thus input. The data thus read out are displayed on the display section 52 and are printed by the printer 54 on a receipt or the like. In addition, accumulation data such as the total amount of money, the number of articles purchased and the like are stored in an article transaction data memory or work area 56 in the RAM 38. At the completion of the registration of all the articles purchased, the total amount of money is displayed and the account is settled in cash or by means of the card 20.

In case of an account settlement by means of the card 20, the card number on the card 20 is input through the card reader section 42 and the password number is input through the PIN pad section 44. The CPU 36 prepares a settlement request which is then sent to the host computer 34 of a credit company or a like destination through the communication control section 32. The CPU 36 receives a response from the host computer 34 and through the communication control section 32 informs the CPU 36 that the account has been settled. The communication control section 32 controls the execution of the procedure utilized in the card handling operation. The CPU 36 then prepares and sends settlement data to the printer 54 which prints information on a receipt indicating that the predetermined settlement is completed and the printer then issues the receipt. As has been described above, in the account settlement by means of the card 20, it is necessary to input the card number of the card into the POS terminal.

Figure 3A:
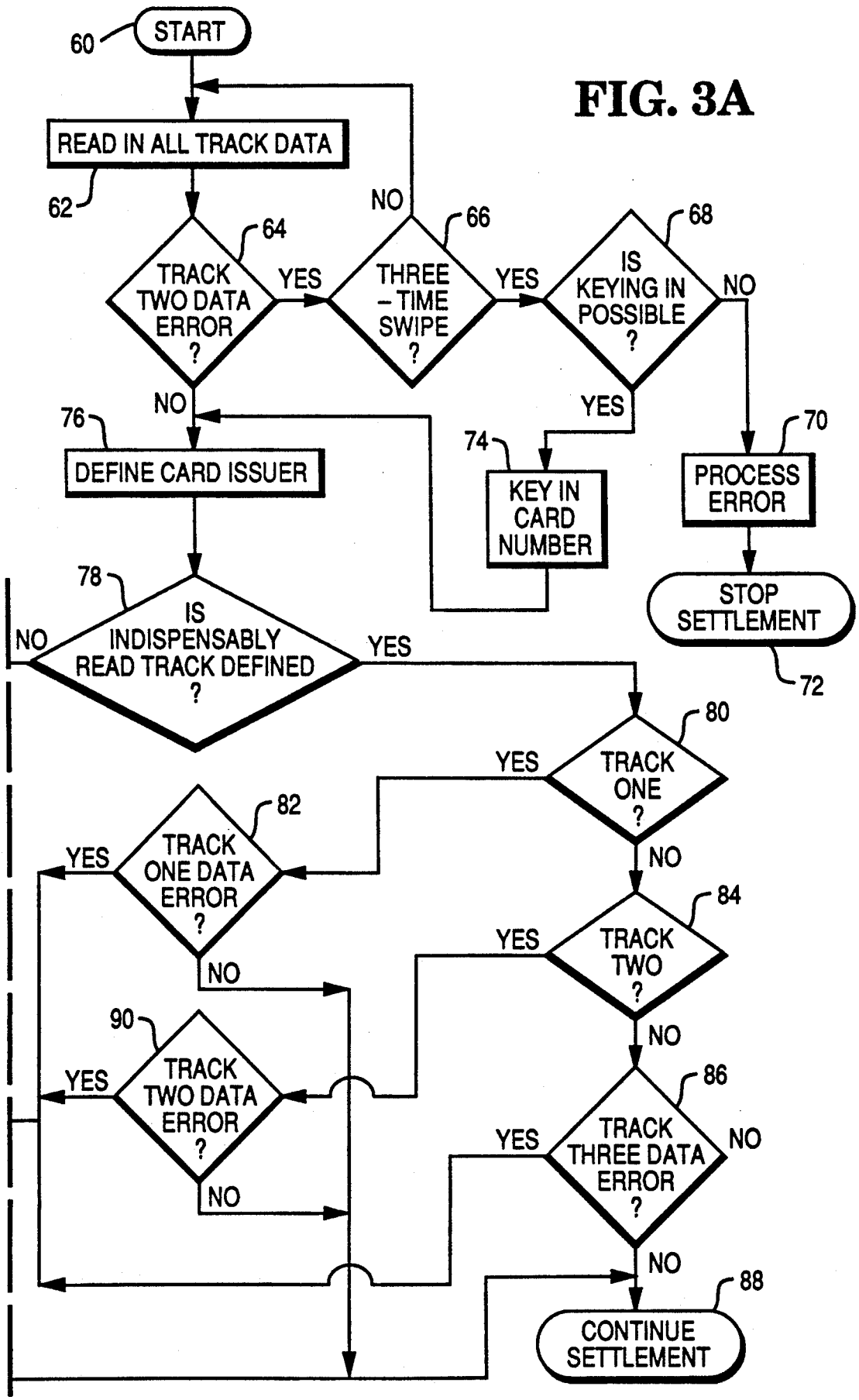
FIGS. 3A and 3B, taken together, constitute a flow chart illustrating the card data processing procedure.
Figure 3B:
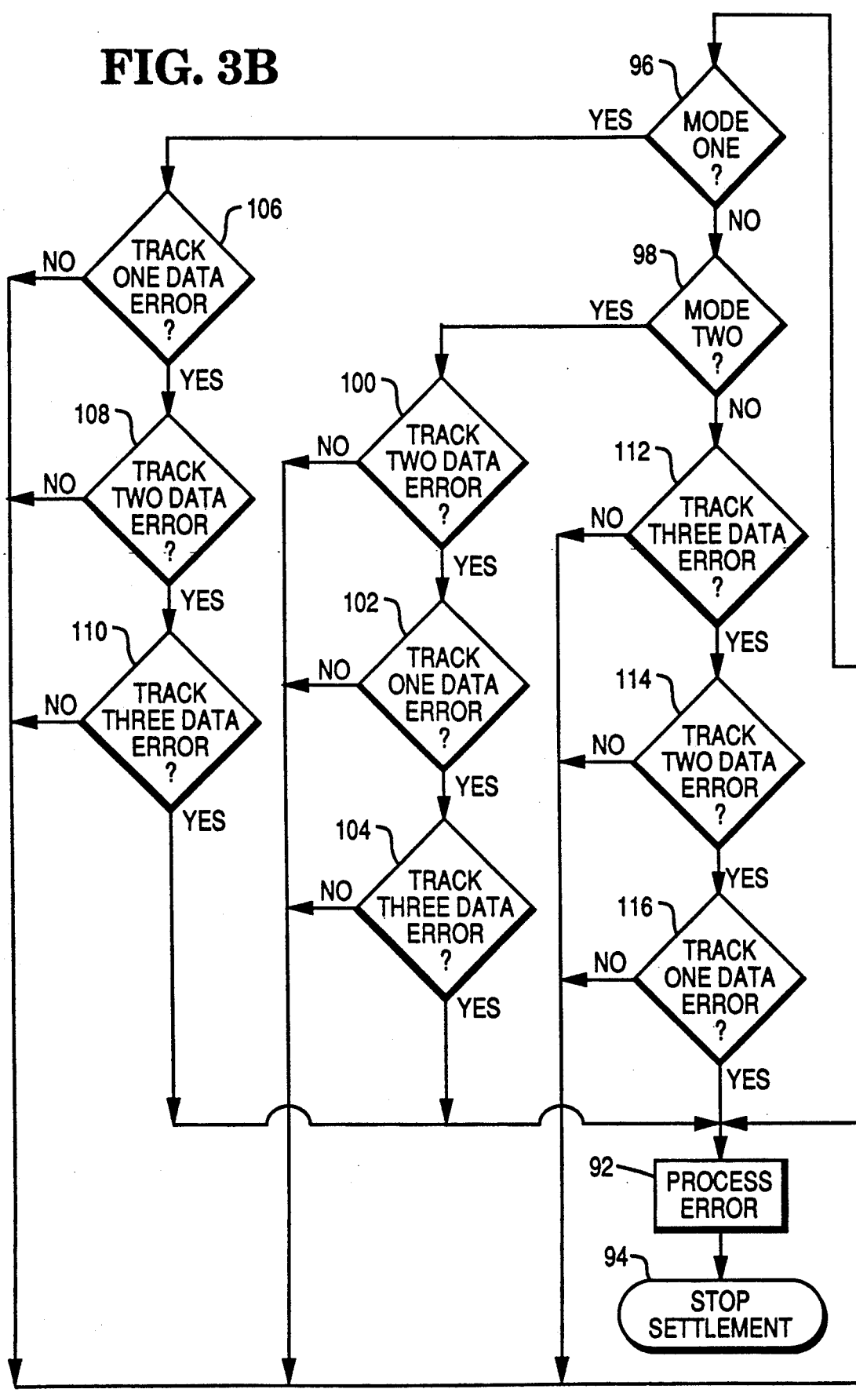

The inputting of data on the card 20 will be described with reference to the flow chart shown in FIGS. 3A and 3B. First, as seen in FIG. 3A, a customer starts the operation (block 60) and swipes the card 20 through the customer information input section 22, (FIG. 1). The magnetic data in tracks 1, 2 and 3 on the magnetic stripe of the card 20 are read (block 62) by the card reader section 42 (FIG. 2) and are stored in the track data memory area 58 in the RAM 38. In order to definitely decide the identity of a card issuer, the data in track 2 is read out from the track data memory area 58 and checked in accordance with the track 2 check program stored in the ROM 40. When the data is not correctly read in track 2 (block 64), a display indicating that one more swipe of the card is requested is made on the display 52. The customer can swipe the card 20 through the input section 22 for reading of correct data up to a maximum of three times (block 66). When a read error occurs three times, the flow goes to the next step (block 68) in which it is checked to see whether or not keyboard entry of information is possible. If keyboard entry is not possible, an error handling operation is performed within the system and account settlement by means of the card 20 is stopped (blocks 70 and 72). In the event an entry is possible, the keyboard entry of the card number is performed by the PIN pad section 44 (block 74). When the data such as the card number or the like in track 2 is correctly read or the card number is correctly keyed in, the table 28 (FIG. 2) is accessed and the card issuer is definitely identified from the card number (block 76).

FIG. 4 shows an example of the table 28 and including tracks and modes according to the present invention. The individual card numbers are respectively allocated to individual card issuers and hence the card issuer can be definitely identified if the card number is found. The card data handling mode is also stored in table 28.

In a column section 75 (FIG. 4) of the table 28 for the indispensably read tracks, the numbers of indispensably read tracks are shown in case the same tracks are used as the indispensably read tracks for all of the cards issued from the same card issuer. For example, in FIG. 4, for the card issued from the A card issuer, track 1 is used as the indispensably read track and for the card issued from the C card issuer, track 3 is used as the indispensably read track.

However, in case the same card issuer uses different indispensably read tracks for different cards, for example, for the cards issued from the card issuer B, both of the indispensably read tracks 1 and 2 or either one of them and another indispensably read track are used. Therefore, as shown in FIG. 4, in the column section 75 of the table 28 and for describing the indispensably read track detecting procedure, the mode for definitely identifying the indispensably read track is specified.

As shown in FIG. 5, the modes 1, 2 and 3 indicate the orders of checking the data in each of the three tracks and the orders are different for different mode numbers. A track of high probability to be specified as an indispensably read track is different for different card issuers, so that the indispensably read track retrieving mode for each card issuer is registered in advance.

Continuing with the procedure as shown in FIG. 3A, the card 20 for which the indispensably read track is set will now be described. From the card number of the card that is read out (or keyed in), the indication that the card is issued from card issuer A (hereinafter referred to as the A company) and that the indispensably read track for the card is track 1 are read out (block 76). The indispensably read track 1 is specified (blocks 78 and 80), so that the data in track 1 is read out from the track memory area 58. If the data is correctly read in the track with no error (block 82), the flow goes to a settlement step (block 88) wherein the data in track 1 is transmitted from the communication control section 32 to the host computer 34 and settlement through the card 20 is continued and completed. However, if the data in track 1 is not correctly read in the step (block 82), card error is displayed on the display section 52 and settlement through the card is stopped (blocks 92 and 94 in FIG. 3B). In case of the card for which the indispensably read track 2 is specified (block 84), if the data read in track 2 is confirmed (block 90) and if the data is correct, the process is continued to the settlement step (block 88). If the data is incorrect, an error handling operation is performed and the settlement is stopped (block 94). In case of the card for which the indispensably read track 3 is specified, the flow goes to the next step (block 86) in which the data in the track 3 is confirmed and the data is processed in the same manner as that for the indispensably read tracks 1 and 2 (blocks 92, 94 and 88).

Another arrangement in the present system is the case wherein the same card issuer uses different indispensably read tracks for different kinds of cards. If from the card number of the card that is input and from the table 28, it is found that the card 20 is issued from card issuer B (hereinafter referred to as the B company) and the B company cannot specify an indispensably read track, the mode for definitely deciding the indispensably read track is then specified (blocks 76 and 78). The mode 2 is specified and hence the mode 2 is followed to the next two steps (blocks 96 and 98). In accordance with the mode 2 in FIG. 5, first, the second track data memory area is accessed and it is checked to see whether or not the data in the track 2 read out is correct (block 100). If the data in the track 2 is correctly read out, the track 2 is defined as the indispensably read track and the flow goes to the step in which the settlement is continued (block 88). If the data in the track 2 is incorrectly read out, the flow goes to another step (block 102) and a check is made to see whether or not the data read out from the track 1 is correct. If the data in the track 1 is correctly read out, the track 1 is defined as the indispensably read track and the flow goes to the step in which the settlement is continued (block 88). However, if an error is found in the data in track 1, the flow goes to another step (block 104) in which the data in track 3 is read out. However, for the card issued from the B company, the data is written into both or either one of the tracks 1 and 2, so that no data is found in track 3 and hence the flow goes to the error step due to the absence of read data and the settlement is stopped (blocks 92 and 94). In case that the read mode 1 is specified, the tracks 1, 2 and 3 are judged in this order, as indicated by blocks 106, 108 and 110. Similarly, in case the read mode 3 is specified, the tracks 3, 2 and 1 are judged in this order, as indicated by blocks 112, 114 and 116. As a result of the judgment of the data read out from the individual tracks, the data which is correctly read in first is defined as the indispensably read track and the track data which is defined based on the definition mentioned above is transmitted to the host computer 34 wherein the settlement is continued (block 88). On the other hand, if all the track data read in are incorrect, the settlement is stopped (block 94).

The CPU 36 includes executing means for reading stored data from the RAM 38 in accordance with a defined track number signal sent from the confirming means 24 or from the retrieving means 26 and the executing means then sends the track data to the host computer.

The present invention provides the customer information input section 22 which is capable of reading the card data in all the tracks, the indispensably read track confirming means 24, the indispensably read track retrieving and defining means 26, and the table 28 for defining and detecting the indispensably read track thereby permitting the handling of different kinds of cards issued from the same card issuer, wherein the card handling work can be smoothly performed. In addition, even though the card issuer issues a new card of different design, it can be readily dealt with simply by changing the specification in the table and using the same card reader.

The present invention enables the accomplishment of the objects and advantages mentioned above, and while a preferred embodiment has been disclosed herein, variations thereof may occur to those skilled in the art. It is contemplated that all such variations and any modifications not departing from the spirit and scope of the invention hereof are to be construed in accordance with the following claims.

What is claimed is:

1. A card handling apparatus for reading data on a card having a magnetic stripe including a plurality of magnetic recording tracks, for identifying a track to be indispensably read, and for performing a business transaction based on data recorded in said indispensably read track, read means adapted to read out data recorded in said plurality of tracks, memory means adapted to store all the data read out in each track, table means containing the number of the track to be indispensably read and which number is previously stored in accordance with recorded data provided by the issuer of the card, confirming means adapted to determine the card issuer in accordance with data read out from said plurality of tracks and to read out the number of the track read from said table means upon determining the card issuer and to send out a signal indicative of the track number, retrieving and defining means adapted to determine the indispensable read out track in accordance with predetermined retrieving procedure which is contained in said table means, and to output a signal indicative of the number of the indispensable track when no track can be confirmed by said confirming means, and executing means adapted to read out from said memory means the recorded data read from said indispensable track and stored in said memory means in accordance with the table means track number signal sent from said confirming means or from said indispensable track number signal sent from said retrieving means to execute a business transaction.

2. The card handling apparatus of claim 1 wherein said retrieving means checks each track for data error in the data stored in said memory means for each track and first selects a track having no error as the track to be indispensably read to retrieve and determine the indispensably read track.

3. The card handling apparatus of claim 1 wherein said retrieving means checks each track for data error in the data stored in said memory means for each track and selects a track having no error on a priority basis as that track to be indispensably read to determine the indispensably read track.

4. The card handling apparatus of claim 1 wherein the read means comprises a card reader, a keyboard for entering an identification number and a display for displaying the entered number.

5. The card handling apparatus of claim 1 wherein said memory means includes central processing means and random access memory means.

6. The card handling apparatus of claim 1 wherein said retrieving and defining means includes central processing means and read only memory means.

7. A method for searching a plurality of tracks of a magnetic stripe on a credit card to determine the indispensably read out track for completing a business transaction, comprising the steps of:

reading a card number from any one of the plurality of tracks, determining if the credit card has an indispensably read out track previously recorded by the issuer of the card, reading out a track number for indispensable data from memory if an indispensably read out track has been previously recorded, reading out indispensable data from the read out track using the track number, reading out a track searching mode on a priority basis from memory if such indispensably read out track has not been recorded, reading out a first priority track which is identified by the mode for the credit card, determining the read out data as being indispensable if no reading error occurs, and sending the indispensable data to a host computer for a business transaction.

8. The method of claim 7 including the additional step of providing table means containing track searching modes for different issuers of credit cards.

* * * * *